(12) United States Patent
Arimatsu et al.

(10) Patent No.: US 8,841,814 B2
(45) Date of Patent: Sep. 23, 2014

(54) ELECTRIC MOTOR HAVING SLEEVE MOUNTED TO ROTARY SHAFT WITH HIGH PRECISION

(75) Inventors: Yohei Arimatsu, Yamanashi (JP); Shinobu Takano, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 13/471,535

(22) Filed: May 15, 2012

(65) Prior Publication Data
US 2012/0326555 A1 Dec. 27, 2012

(30) Foreign Application Priority Data

Jun. 24, 2011 (JP) ................................. 2011-140927

(51) Int. Cl.
| | | |
|---|---|---|
| H02K 1/06 | (2006.01) | |
| H02K 9/00 | (2006.01) | |
| H02K 1/32 | (2006.01) | |
| H02K 1/30 | (2006.01) | |
| H02K 1/27 | (2006.01) | |
| H02K 17/16 | (2006.01) | |
| H02K 7/00 | (2006.01) | |

(52) U.S. Cl.
CPC ...... *H02K 1/30* (2013.01); *H02K 1/276* (2013.01); *H02K 17/16* (2013.01); *H02K 7/003* (2013.01)
USPC .. 310/216.121; 310/58; 310/61; 310/216.119

(58) Field of Classification Search
CPC .................................. B23B 19/02; B23Q 5/04
USPC ..................................................... 310/58, 61
See application file for complete search history.

(56) References Cited

U.S. PATENT DOCUMENTS

| | | | | |
|---|---|---|---|---|
| 5,164,059 A | * | 11/1992 | Geiermann et al. .......... 204/206 |
| 6,413,026 B1 | * | 7/2002 | Lind .............................. 409/135 |

FOREIGN PATENT DOCUMENTS

| | | |
|---|---|---|
| DE | 1400873 A1 | 1/1969 |
| DE | 4341514 A1 | 6/1995 |
| DE | 10239561 A1 | 3/2004 |
| JP | 63-105441 U | 7/1988 |
| JP | 2-94444 U | 7/1990 |
| JP | 5026202 U | 4/1993 |
| JP | 8-257805 A | 10/1996 |
| JP | 8-294802 A | 11/1996 |

(Continued)

OTHER PUBLICATIONS

Machien Translation JP08294802 (1996).*

(Continued)

*Primary Examiner* — Tran Nguyen
*Assistant Examiner* — Jose Gonzalez Quinone
(74) *Attorney, Agent, or Firm* — Lowe Hauptman & Ham, LLP

(57) ABSTRACT

In an electric motor 11, a rotary shaft 12 has an outer circumferential surface 21 with a diameter that decreases from a larger diameter section 17 having a first diameter toward a smaller diameter section 18 having a second diameter smaller than the first diameter. A sleeve 13 is mounted by interference fit with an inner circumferential surface 22 with a diameter that decrease from a front end adjoining the larger diameter section 17 toward a rear end adjoining the smaller diameter section 18, to the outer circumferential surface 21 of the rotary shaft 12. With such a construction, the sleeve 13 is fitted with the substantially entire surface of the inner circumferential surface 22 to the outer circumferential surface 21 of the rotary shaft 12.

13 Claims, 9 Drawing Sheets

(56) References Cited

FOREIGN PATENT DOCUMENTS

| | | | | |
|---|---|---|---|---|
| JP | 08294802 | A | * | 11/1996 |
| JP | 10225032 | A | | 8/1998 |
| JP | 11-099403 | A | | 4/1999 |
| JP | 11333601 | A | | 12/1999 |
| JP | 2004098188 | A | * | 4/2004 |
| SU | 1208351 | A | * | 1/1986 |

OTHER PUBLICATIONS

Machine Translation JP2004098188 (2004).*
JP Office Action, dated Jul. 24, 2012 in JP Application No. 2011-140927.
Office Action dated Nov. 27, 2013, corresponds to German patent application No. 102012011913.5.

* cited by examiner

ELECTRIC MOTOR HAVING SLEEVE MOUNTED TO ROTARY SHAFT WITH HIGH PRECISION

RELATED APPLICATIONS

The present application is based on, and claims priority from, Japanese Application No. 2011-140927, filed Jun. 24, 2011, the disclosure of which is hereby incorporated by reference herein in its entirety.

BACKGROUND OF THE INVENTION

1. Field of the Invention

The present invention relates to an electric motor comprising a rotor part, and a sleeve mounted to a rotary shaft to hold the motor part.

2. Description of the Related Art

Japanese Unexamined Utility Model Application Publication No. 05-26202, for example, discloses, a so-called built-in motor. In this motor, a rotor is mounted to a rotary shaft via a sleeve. On an inner circumferential surface of the sleeve, a plurality of protrusions are formed which radially project toward an outer circumferential surface of the rotary shaft. The protrusions annularly extend around a rotation axis of the rotary shaft. On the other hand, the rotary shaft is formed such that its diameter varies, for example, in three steps from one end to the other end thereof. As the diameter of the rotary shaft varies, the protrusions correspondingly project in different lengths from the inner circumferential surface of the sleeve. Thus, the sleeve is formed as a so-called stepped sleeve. In mounting the rotor to the rotary shaft, the sleeve is mounted by shrinkage fit to the rotary shaft, and is pressed at the protrusions against the outer circumferential surface of the rotary shaft.

On the other hand, between the protrusions, spaces are formed between the inner circumferential surface of the sleeve and the outer circumferential surface of the rotary shaft. The electric motor needs to be constructed such that the rotor can be removed from the rotary shaft, for example, at the event of malfunction of the motor. In order to remove the rotor from the rotary shaft, working fluid is injected at a certain pressure into the aforementioned spaces. As a result of increasing the inner diameter of the sleeve due to its expansion caused by the pressure of the working fluid, a force is exerted on the sleeve in the direction of the rotation axis since the plurality of protrusions have different inner diameters due to the variation of the diameters of the rotary shaft. Thus, it is possible to remove the sleeve together with the rotor from the rotary shaft in the direction of the rotation axis.

Since the sleeve is received by the rotary shaft only at the protrusions, the contact area of the sleeve is small as compared to the inner circumferential surface of the sleeve. As a result, in order to achieve robust mounting of the sleeve, it is necessary to increase the interference of the sleeve, thereby increasing tightening torque of the sleeve in relation to the rotary shaft. However, such tightening torque is concentrated onto the protrusions at both outer ends of the sleeve. In addition, due to the increase in the interference, the sleeve has to be heated to higher temperature at the time of shrinkage fit. Therefore, local unnecessary stress is exerted to the rotary shaft from the protrusions due to difference in thermal expansion between the rotary shaft and the sleeve. Consequently, the rotary shaft will be subject to deformation or distortion, and oscillation of the rotary shaft will increasingly occur.

The present invention has been made in view of the above-described problem, and thus, the object of the present invention is to provide an electric motor in which a sleeve can be mounted to a rotary shaft with high precision.

SUMMARY OF THE INVENTION

In order to achieve the above object, in accordance with the present invention, there is provided an electric motor comprising:

a rotary shaft having an outer circumferential surface with a diameter that decreases from a larger diameter section having a first diameter toward a smaller diameter section having a second diameter smaller than the first diameter;

a sleeve mounted to the rotary shaft by interference fit with an inner circumferential surface having a diameter that decreases from a front end adjoining the larger diameter section toward a rear end adjoining the smaller diameter section, to the outer circumferential surface of the rotary shaft; and a cylindrical rotor part mounted by interference fit to an outer circumferential surface of the sleeve.

The electric motor may further comprise a fluid passageway extending through from an outer face of the sleeve including the outer circumferential surface of the sleeve to the inner circumferential surface of the sleeve.

The electric motor may further comprise an annular passageway formed between the inner circumferential surface of the sleeve and the outer circumferential surface of the rotary shaft, the annular passageway extending annularly around the rotation axis of the rotary shaft and being connected to the fluid passageway.

The electric motor may further comprise an axial passageway formed between the inner circumferential surface of the sleeve and the outer circumferential surface of the rotary shaft, the axial passageway extending from the annular passageway toward the larger diameter section in the direction of the rotation axis.

The electric motor may further comprise a fluid sealing member held between the inner circumferential surface of the sleeve and the outer circumferential surface of the rotary shaft, and disposed on at least one of a front end side and a rear end side of the sleeve in relation to the fluid passageway.

The electric motor may further comprise an annular member adjoining at least one of the front end and the rear end of the sleeve, and mounted by interference fit to the sleeve.

The electric motor may further comprise a regulating member mounted to the outer circumferential surface of the rotary shaft at the rear end of the sleeve and regulating falling-off of the sleeve from the rotary shaft.

The electric motor may be incorporated into a machine tool.

These and other objects, features, and advantages of the present invention will become more apparent in light of the detailed description of exemplary embodiments thereof as illustrated by the drawings.

DETAILED DESCRIPTION

Embodiments of the present invention will be now described below with reference to appended drawings.

Figure 1:
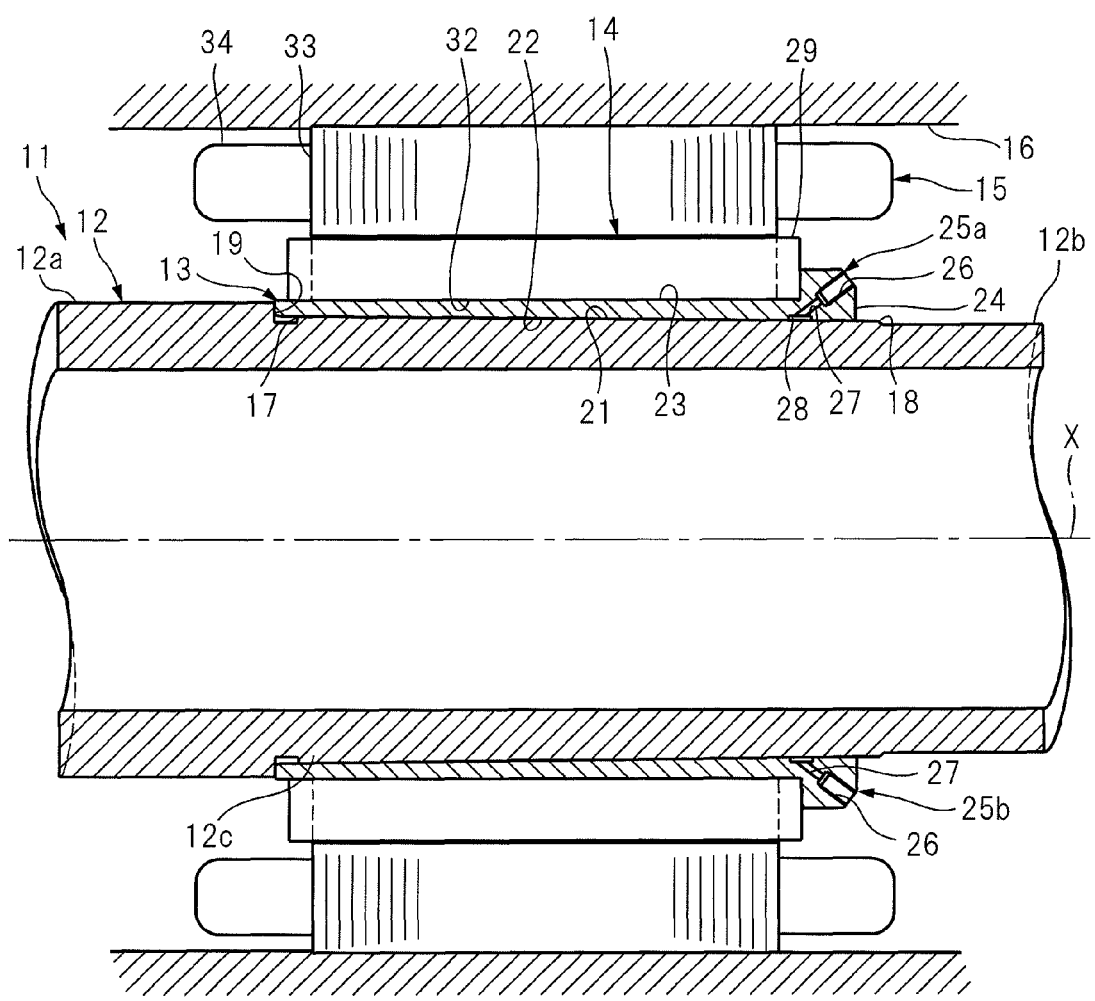
FIG. 1 is a longitudinal sectional view schematically showing an electric motor according to one embodiment of the present invention.

FIG. 1 is a longitudinal sectional view schematically showing an electric motor 11 according to one embodiment of the present invention. This electric motor 11 is, for example, a type of synchronous motor with permanent magnets embedded therein. The electric motor 11 comprises a cylindrical rotary shaft 12 which is, for example, a spindle of a machine tool (not shown), a substantially cylindrical sleeve 13 mounted to the rotary shaft 12, a cylindrical rotor part 14 mounted to the sleeve, a stator 15 facing to the rotor part 14, and a housing 16 which supports the stator 15 on its inner circumferential surface and surrounds the rotary shaft 12 around the rotation axis X of the rotary shaft 12. The electric motor 11 is a type of directly-driven motor, that is, a so-called built-in motor.

The rotary shaft 12 includes a larger diameter portion 12a, a smaller diameter portion 12b having a smaller diameter than that of the larger diameter portion 12a, and a tapered portion 12c disposed between the larger diameter portion 12a and the smaller diameter portion 12b. The larger diameter portion 12a, the tapered portion 12c and the smaller diameter portion 12b are integrally formed. The tapered portion 12c is connected to the larger diameter portion 12a and the smaller diameter portion 12b, for example, in a stepwise manner. An outer circumferential surface of the tapered portion 12c has a contour of circular truncated cone. The diameter of the tapered portion 12c decreases from the larger diameter section 17 having a first diameter toward the smaller diameter section 18 having a second diameter smaller than the first diameter. Between the larger diameter portion 12a and the tapered portion 12c, a stepped surface 19 extending along an imaginary plane perpendicular to the rotation axis X.

The sleeve 13 is mounted to the outer circumferential surface 21 of the tapered portion 12c. The sleeve 13 is mounted to the tapered portion 12c, for example, by interference fit. The diameter of the inner circumferential surface 22 of the sleeve 13 decreases from a front end adjoining the larger diameter section 17 of the tapered portion 12c to a rear end adjoining the smaller diameter section 18 of the tapered portion 12c. The sleeve 13 is fitted on the substantially entire surface of its inner circumferential surface 22 to the outer circumferential surface 21 of the tapered portion 12c. The outer circumferential surface 23 of the sleeve 13 is formed in cylindrical shape. Thus, thickness of the sleeve 13 defined in radial direction perpendicular to the rotation axis X increases from the front end to the rear end of the sleeve 13. Front end surface defined at the front end of the sleeve 13 abuts against the stepped surface 19 between the larger diameter portion 12a and the tapered portion 12c.

A flange 24 which projects outwardly and radially is provided at the rear end of the sleeve 13. A pair of fluid passageways 25a and 25b extend through the sleeve 13 from an outer face including the outer circumferential surface 23 to the inner circumferential surface 22 of the sleeve 13. The fluid passageways 25a and 25b are formed in the sleeve 13, for example, in positions opposed to each other with the rotation axis X interposed therebetween, i.e., in positions in rotational symmetry in relation to the rotation axis X. The fluid passageways 25a and 25b have threaded holes 26, respectively, and a flow path 27 in communication with the threaded holes 26. To one of the threaded holes 26 of the fluid passageways 25a and 25b, a nozzle of fluid pressure source (not shown), for example, is connected. The fluid pressure source supplies working fluid to the flow path 27. The fluid passageways 25a and 25b are used in attachment/detachment of the sleeve 13 from the rotary shaft 12.

On the inner circumferential surface 22 of the sleeve 13, an annular passageway 28 extending annularly around the rotation axis X is formed. The annular passageway 28 consists of a groove formed on the inner circumferential surface 22 of the sleeve 13. The annular passageway 28 is connected to each of the flow paths 27 of the fluid passageways 25a and 25b. With such an annular passageway 28, working fluid supplied from the fluid pressure source to the flow path 27 can spread over the entire circumference of the rotary shaft 12 around the rotation axis X. The annular passageway 28 may be formed as a groove, for example, by turning, cutting, grinding or electric discharge machining, or may be formed as a small groove as a scribe line. In any case, it is ensured that a prescribed cross-sectional area provides for working fluid to flow between the outer circumferential surface 23 and the inner circumferential surface 22.

Preferably, the sleeve 13 is made of magnetic materials, for example, having a large elastic range. Therefore, the sleeve 13 is preferably made, for example, of carbon steel, iron-based alloy steel, etc. When interference of the sleeve 13 has to be large, heat treatment such as hardening and tempering is preferably performed for the material in order to increase the yield point or elastic limit of the material. The thinner the thickness of the sleeve 13, the larger the diameter of the rotary shaft 12 can be increased, thereby improving workability in attaching/detaching the sleeve 13. However, since it is increasingly difficult to process the sleeve as its thickness is thinner, the thickness of the sleeve 13 may be determined accordingly, taking into account of the application and design specification.

Figure 2:
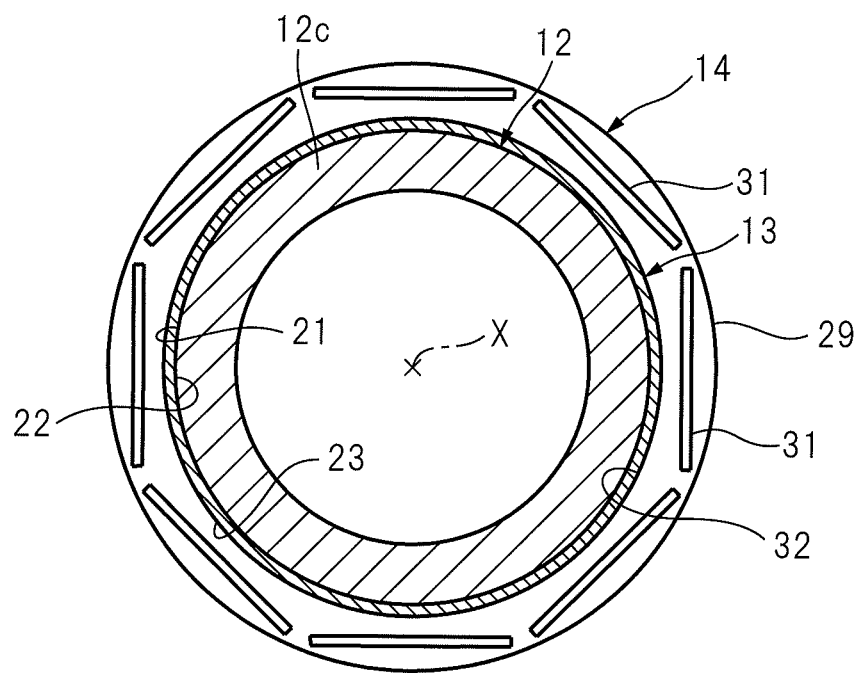
FIG. 2 is a transverse sectional view showing an electric motor according to one embodiment of the present invention.

FIG. 2 is a transverse sectional view schematically showing the electric motor 11 according to one embodiment of the present invention. Referring also to FIG. 2, the rotor part 14 comprises a rotor core 29 formed of a stack of a plurality of magnetic steel sheets stacked along the rotation axis X, and a plurality of permanent magnets 31 embedded in the rotor core 29 and, for example, equally spaced around the rotation axis X. The rotator core 29 is formed in cylindrical, for example. The rotator core 29 is fitted with the inner circumferential surface 32 to the outer circumferential surface 23 of the sleeve 13. Here, the rotor core 29 is fitted with the entire surface of the inner circumferential surface 32 to the outer circumferential surface 23. One end of the rotor core 29 is received by the flange 24 of the sleeve 13. Thickness of the rotor core 29 defined in the direction perpendicular to the rotation axis X is set uniformly along the rotation axis X.

As can be seen in FIG. 1, the sleeve 13 has a constant outer diameter except at the portion of the flange 24. Thus, the outer circumferential surface 23 of the sleeve 13 is a cylindrical surface. On the other hand, the rotor core 29 has a constant inner diameter. That is, the inner circumferential surface 32 of the rotor core 29 is a cylindrical surface. As a result, the rotor core 29 can be mounted by interference fit to the sleeve 13. In the present embodiment, at least the outer diameter at the front end side of the sleeve 13 is set to the size not larger than the inner diameter of the rotor core 29 so as to allow it to be received in the rotor core 29.

Returning to FIG. 1, the stator 15 comprises a stator core 33 opposed to the permanent magnet 31 of the rotor core 29, and a coil 34 wound around the stator core 33. The stator core 33 is formed of a stack of a plurality of magnetic steel sheets stacked in the rotation axis X. The stator core 33 is formed in, for example, cylindrical form. Thickness of the stator core 33 defined in the direction perpendicular to the rotation axis X is set uniformly along the rotation axis X. As a result, the stator core 33 is opposed to the rotor core 29 at a constant distance along the rotation axis X. The coil 34 is formed of copper wire, for example. The stator 15 is fixed to the inner circumferential surface of the housing 16. Rotational force is transmitted to the rotor part 14, i.e., to the rotary shaft 12 by magnetic interaction between the stator 15 and the rotor part 14.

Next, a process for mounting the sleeve 13 to the rotary shaft 12 will be described. Prior to mounting, the rotor part 14 is mounted by interference fit to the outer circumferential surface 23 of the sleeve 13. In this way the rotor part 14 is fixed to the sleeve 13. At this time, the rotor part 14 is mounted to the sleeve 13 with relatively small interference as in temporary fastening. Then, lubricant is applied to the outer circumferential surface 21 of the tapered portion 12c of the rotary shaft 12. The sleeve 13 is fitted onto the rotary shaft 12 which is held, for example, in a press machine. The sleeve 13 is pushed toward the larger diameter portion 12a along the rotation axis X. Since the sleeve 13 has a certain interference in relation to the rotary shaft 12, i.e., the outer diameter of the tapered portion 12c is set slightly larger than the inner diameter of the sleeve 13, the sleeve 13 is pressed into the tapered portion 12c. The outer diameter of the sleeve 13 is increased by expansion. As a result, interference fit of the sleeve 13 to the rotary shaft 12 is achieved, and interference fit of the rotor part 14 to the sleeve 13 is achieved at the same time. In this way, the sleeve 13 and the rotor part 14 are finally mounted with certain interference to the rotary shaft 12. In other words, the sleeve 13 is mounted to the rotary shaft 12 with a certain tightening torque.

The electric motor 11 is constructed such that the outer circumferential surface 21 of the tapered portion 12c of the rotary shaft 12 and the inner circumferential surface 22 of the sleeve 13 have diameters that decrease from one end toward the other end. Therefore, if the sleeve 13 is pressed onto the rotary shaft 12 by pushing farther than a predetermined distance, the interference increases more than predetermined interference. On the contrary, if the pushing distance does not reach the predetermined pushing distance, the interference does then not achieve the predetermined interference. In order to avoid them, the position of the stepped surface 19 of the rotary shaft 12 in the direction of the rotation axis X is preferably set such that the predetermined interference can be secured by the front end of the sleeve 13 abutting against the stepped surface 19 of the rotary shaft 12.

The amount of the interference is determined by taking into account the maximum rotational speed and the maximum torque of the electric motor 11. In general, the higher the rotational speed of the motor 11, the larger the centrifugal force becomes. In this case, the interference needs to be set larger. As the maximum torque generated in the electric motor 11 becomes greater, the tightening torque of the sleeve 13 to the rotary shaft 12 needs to be set greater. In this case, the interference needs to be set larger. Therefore, the amount of interference is determined by adding a certain margin to the magnitude of the maximum rotational speed and the maximum torque.

Lubricant promotes the pressing of the sleeve 13 into the tapered portion 12c by lubrication. As the viscosity of the lubricant increases, possibility of trouble such as galling, etc., decreases. Then, however, it requires time to generate necessary tightening torque due to friction. On the other hand, as the viscosity becomes lower, lubricating effect may become insufficient. Thus, although adequate care is required, upon completion of press-in process, lubricant is discharged rapidly to the outside by the areal pressure. In this way, the predetermined tightening torque can be secured by friction immediately after the press-in process. As the lubricant, lubricating oil having viscosity of about VG2 to VG22, for example, or a spray type of general multi-purpose lubricant can be used.

Further, at the time of pressing the sleeve 13 into the rotary shaft 12, the fluid pressure source may be connected to either one of the fluid passageways 25a and 25b. At this time, a nozzle of the fluid pressure source is screwed into the threaded hole 26. In this way working fluid may be injected from the fluid pressure source to the flow path 27. With the working fluid, it is possible to utilize the working fluid as lubricating oil, for example, when interference is relatively large. As a result, at the time of press-in process, the sleeve 13 can slide more easily. If the interference is relatively small, the aforementioned lubricant is adequate for this purpose, so that the working fluid may not be used at the time of press-in process of the sleeve 13. The fluid passageway which is not used for injection of the working fluid can be used as an air vent when the working fluid is injected.

Next, a process for removing the sleeve 13 from the rotary shaft 12 will be described. When the rotor part 14 is removed from the rotary shaft 12 for some reason, the fluid pressure source is connected to either one of the fluid passageways 25a and 25b. In this way working fluid is thus injected from the fluid pressure source to the flow path 27. Working fluid spreads between the inner circumferential surface 22 of the sleeve 13 and the outer circumferential surface 21 of the tapered portion 12c. Since diameters of the tapered portion 12c of the rotary shaft 12 and of the sleeve 13 decrease from one end toward the other end, the sleeve 13 is moved by means of the working fluid from the tapered portion 12c in the direction of the rotation axis X toward the portion having the smaller diameter. As a result, the sleeve 13, that is, the rotor part 14, is removed from the rotary shaft 12.

Pressure of working fluid at the time of removing the sleeve 13 is determined based on various factors such as interference determined by the maximum rotational speed or the maximum torque of the electric motor 11, magnitude of taper, i.e., taper ratio of the inner circumferential surface 22 of the sleeve 13 and the outer circumferential surface 21 of the tapered portion 12c, material of the sleeve 13, type and size of the rotor part 14, etc. Pressure of he working fluid is preferably set in the range of, for example, 10 MPa to 70 MPa. When safety and workability of the removal operation of the sleeve 13 is taken into account, pressure of working fluid is more preferably set in the range of 15 MPa to 50 MPa.

The taper ratio of the outer circumferential surface 21 of the tapered portion 12c and the inner circumferential surface 22 of the sleeve 13 is preferably, for example, in the range of 1/20 to 1/500, and more preferably, for example, in the range of 1/50 to 1/200. As the taper ratio increases, the sleeve 13 can be removed more easily, but tightening torque may become insufficient. On the contrary, as the taper ratio decreases, tightening torque increases, but it is more difficult to remove the sleeve 13. Further, as the taper ratio becomes decreases, greater pushing distance along the rotation axis X is required to reach the required interference. The taper ratio is determined by taking into account these factors.

At the time of removing the sleeve 13, a method in which pressure of the working fluid is gradually increased until the sleeve 13 is moved along the rotation axis X, may be adopted. Also, a method in which pressure of the working fluid is gradually increased until predetermined pressure is reached, and it is left as is for some minutes to some hours until the sleeve 13 is moved in the direction of the rotation axis X, may be adopted. The fluid passageways 25a and 25b may be formed not on the sleeve 13 but on the rotary shaft 12. Further, depth and width of the groove forming the annular passageway 28 may be appropriately set in accordance with a processing condition for forming the groove. The fluid passageway 25 and the annular passageway 28 and the permanent magnets 34 are disposed in rotational symmetry in relation to the rotation axis X, considering balance of the rotator body.

In the electric motor 11 as described above, the sleeve 13 can be fit with the substantially entire surface of the inner circumferential surface 22 to the outer circumferential surface 21 of the rotary shaft 12. As a result, the rotary shaft 12 is prevented from being tightened by the sleeve with locally excessive interference. Tightening force of the sleeve 13 with interference is exerted substantially evenly onto the outer circumferential surface 21 of the rotary shaft 12 with the entire surface of the inner circumferential surface 22 of the sleeve 13. In this way, the sleeve 13 comes into contact with the rotary shaft 12 on larger area than is hitherto possible. Comparable tightening torque can be secured with smaller interference than the prior art. In addition, since tightening torque is not exerted locally on the rotary shaft 12, deformation and distortion of the rotary shaft can be avoided. Thus, the sleeve 13 can be mounted to the rotary shaft 12 with high precision. Occurrence of oscillation of the rotary shaft 12 can be suppressed.

Moreover, with the construction as described above, it is possible to mount the sleeve 13 by press-in onto the rotary shaft 12, so that shrink fit operation which is indispensable in the prior art can be omitted. As a result, heating of the sleeve 13 integrated into the rotor part 14 can be omitted, or time required to return to ordinary temperature after shrink fit can be saved. Consequently, equipments such as an electric furnace are not required. Time for a mounting operation of the sleeve 13 can be shortened so that the operation cost can be reduced. Since heating is not required, thermally vulnerable permanent magnet 31 is not affected. The manufacturing cost of the electric motor 11 can be reduced. By increasing the contact area of the sleeve 13 with the rotary shaft 12, interference can be reduced, so that, even when the sleeve 13 is mounted by shrinkage fit to the rotary shaft 12, heating at as high temperature as in the prior art is no longer required.

Further, the sleeve 13 is fitted with the substantially entire surface of the inner circumferential surface 22 to the outer circumferential surface 21 of the rotary shaft 12. At the same time, the rotor part 14 is fitted with the substantially entire surface of the inner circumferential surface 32 to the outer circumferential surface 23 of the sleeve 13. As a result, since the sleeve 13 is mounted to the rotary shaft 12 by certain interference, the sleeve 13 is expanded, and this expansion of the sleeve 13 influences interference of the rotor part 14 in relation to the sleeve 13. Since magnitude of this effect is uniform in the direction along the rotation axis X, the rotor part 14 and the sleeve 13 are mounted by interference fit with interference taking into account the magnitude of the expansion beforehand. Then, the interference does not excessively increase locally, and the rotor part 14 and the sleeve 13 can be mounted by uniform tightening torque in the direction along the rotation axis X. As a result, occurrence of deformation and distortion of the rotary shaft 12 can be avoided.

Working fluid can be uniformly injected to the entire circumference of the rotary shaft 12 around the rotation axis X by means of the annular passageway 28 formed on the inner circumferential surface 22 of the sleeve 13. Fluid pressure is exerted uniformly on the outer circumferential surface of the rotary shaft 12. Thickness of the sleeve 13 decreases from the rear end to the front end. As a result, due to the difference in tightening torque caused by the thickness of the sleeve 13, as the pressure increases, the working fluid spreads along the interface between the inner circumferential surface 22 of the sleeve 13 and the outer circumferential surface 21 of the rotary shaft 12 from the rear end having a smaller diameter to the front end having a larger diameter. Thus, the sleeve 13 can be easily removed from the rotary shaft 12. Forming the annular passageway 28 can be omitted, for example, in the case of relatively small interference, where the working fluid can be easily injected around the rotary shaft 12.

In addition, the fluid passageway 25 is formed in the flange 24 of the sleeve 13. Therefore, in portions other than the flange 24, the sleeve 13 can be formed to have smaller thickness than hitherto possible. In this way diameter of the rotary shaft 12 can be increased to the extent that the sleeve is made thinner. Increase of the diameter of the rotary shaft 12 makes it possible to increase rigidity of the rotary shaft 12 as well as to increase natural frequency of the rotary shaft 12. For example, natural frequency of the rotary shaft 12 can be increased well above the maximum rotational speed of the rotary shaft 12. Oscillation of the rotary shaft 12 can be then reduced. Thus, performance of the rotary shaft 12 can be improved.

Next, examples of the present invention will be described. The electric motor 11 according to the example constitutes a synchronous motor with permanent magnets embedded therein. The maximum rotational speed of the electric motor 11 was set to 12000 revolutions per minute (rpm). As has been described above, the rotor part 14 comprises a rotor core 29 formed of a stack of a plurality of magnetic steel sheets stacked in the direction of the rotation axis X, and a plurality of permanent magnets 31 embedded in the rotor core 29 and, for example, equally spaced around the rotation axis X. For the rotor part 14, the outer diameter was set to 132.000 mm, and the inner diameter was set to 104.000 mm. Length of the rotor part 14 defined in the direction of the rotation axis X was set to 100 mm.

In mounting to the sleeve 13, interference of the rotor part 14 is determined. If the rotational speed of 12000 revolutions per minute is set, expansion of the inner diameter of the rotor part 14 is calculated to be 40 μm. In calculating this, a formula for rotating disc in general mechanics of materials, for example, or a finite element analysis, may be used. In the case where 40 μm is set as interference, it means that, when the electric motor reaches rotational speed of 12000 revolutions per minute, tightening force (that is, tightening torque, or transmission torque) becomes zero due to centrifugal force. Therefore, in practical use, in addition to this 40 μm, interference that can transmit the maximum torque which may occur in the electric motor while operating at 12000 revolutions per minute, as well as a margin for inadvertent excessive speed or overload, for example, 30 μm is added, and thus 70 μm is selected as a target interference. The margin is appropriately adjusted depending upon the specification or application of the electric motor 11.

In the case where the target interference was set to 70 μm, as described above, for the rotor part 14, the outer diameter was set to 132.000 mm, the inner diameter was set to 104.000 mm. On the other hand, for the sleeve 13, the outer diameter was set to 104.010 mm, and the inner diameter, at 60 mm from the front end of the sleeve 13 toward the rear end was set to 98.000 mm. The outer diameter of the rotary shaft 12 at 60 mm from the larger diameter section toward the smaller diameter section was set to 98.060 mm. The taper ratio of the outer circumferential surface 21 of the rotary shaft 12 and the inner circumferential surface 22 of the sleeve 13 was set to 1/50. In this condition, the rotor part 14 was mounted to the outer circumferential surface 23 of the sleeve 13.

Specifically, the sleeve 13 is inserted into the rotor part 14. At this time, the rotor part 14 is heated to a predetermined temperature. As described above, since the difference between the inner diameter of the rotor part 14 and the outer diameter of the sleeve 13, i.e., the interference is about 10 μm, and the outer diameter of the sleeve 13 is 104.000 mm, the rotor part 14 needs only to be heated to temperature of about 20° C. to 30° C. higher than the sleeve 13. The rotor part 14 may also be pushed into the sleeve 13 by a press machine at ordinary temperature. In this way, the rotor part 14 is temporarily fixed by interference fit to the sleeve 13.

In the sleeve 13 with the rotor part 14 temporarily fixed thereto, the inner diameter of the sleeve 13 decreases due to compression force exerted by the rotor part 14. For example, the original inner diameter of 98.000 mm will decrease by about 5 to 6 μm in diameter. The decreased amount may vary depending on the material and thickness, and cross-sectional shape of the sleeve 13 and the rotor part 14, and balance of rigidity between them. When the rotor part 14 is mounted by interference fit to the sleeve 13, the outer diameter of the rotor part 14 increases while the inner diameter of the sleeve 13 decreases.

Then, the sleeve 13 holding the rotor part 14 is pushed into the rotary shaft 12, for example, by means of a hydraulic press machine. The aforementioned lubricant has been applied to the tapered portion 12c of the rotary shaft 12. The sleeve 13 was fitted to and pushed into the tapered portion 12c by the press machine. At this time, the sleeve 13 was pushed continuously without interruption until the front end thereof abuts against the stepped surface 19 of the rotary shaft 12. Pressing force of the press was set to about 15 tons when the lubricant VG22 was used. When the sleeve 13 was mounted by interference fit to the rotary shaft 12, the inner diameter of the sleeve 13 increased so that a predetermined tightening torque was achieved between the rotor part 14 and the sleeve 13, and at the same time, a predetermined tightening torque was achieved between the sleeve 13 and the rotary shaft 12.

Several conditions are assumed for the calculation described above. For example, since the rotary shaft 12 has sufficient thickness, it has been assumed that it does not contract in the radial direction. Since contraction of the rotary shaft 12 per se is undesirable, the rotary shaft 12 is required to have sufficient rigidity. Since the rotor part 14 and the sleeve 13 are expanded slightly in the direction along the rotation axis X, the interference decreases somewhat from 70 μm as described above. The decreased amount, however, is extremely small, and thus, it suffices to be included a additional interference which is considered to be a margin in determining the target interference.

In the above example, when the rotor part 14 needs to be fixed to the rotary shaft 12 with interference of, for example, 70 μm, it is sufficient to set the sum of the interference between the rotor part 14 and the sleeve 13 and the interference between the sleeve 13 and the rotary shaft 12 to 70 μm. A margin of, for example, about a few μm to a few tens of μm may also be added to the sum. On the other hand, according to the prior art disclosed in the aforementioned Japanese Unexamined Utility Model Application Publication No. 05-26202, the sleeve is tightened at the protrusions at its both ends by the rotary shaft. As a result, the tightening torque by the interference between the sleeve and the rotor part is not sufficiently transmitted to the interference between the sleeve and the rotor part, as the interference is divided at the two protrusions. Therefore, the interference at the two protrusions becomes excessively large and may result in deformation or distortion of the rotary shaft.

On the other hand, in the built-in motor as disclosed in the aforementioned Japanese Unexamined Utility Model Application Publication No. 05-26202, the rotor is mounted by interference fit to the sleeve with uniform interference. Thereafter, the sleeve is mounted by shrinkage fit to the rotational spindle with certain interference. Since the sleeve is fitted to the rotational spindle only with certain convex portions, the interference between the sleeve and the rotational spindle has to be set larger than the interference between the rotor and the sleeve. At this time, since the sleeve expands especially at the convex portions at both ends in the rotation axis, the interference between the rotor and the sleeve becomes excessively larger at both ends of the sleeve than predetermined interference. As a result, a greater tightening force is exerted to the rotational spindle from both ends of the sleeve, so that deformation or distortion of the rotational spindle occurs, causing undesirable results such as impaired rotational balance and occurrence of oscillation.

Also, in Japanese Unexamined Utility Model Application Publication No. 05-26202, if an interference is set by subtracting an excessive amount of interference from the interference of the rotor and the sleeve, although occurrence of the excessive interference at both ends of the sleeve is relieved, the interference becomes insufficient at a concave portion in the middle of both ends of the sleeve. Due to the insufficient tightening torque, gap is formed as a result of deformation of the rotor or of centrifugal force, thereby causing troubles such as oscillation and noise, possibly at worst, racing as well. On the other hand, if the excessive interference is subtracted beforehand from the interference between the sleeve and the rotational spindle, the tightening torque may become simply insufficient, resulting in racing of the rotor. It is conceivable to partially change the interference between the rotor and the sleeve, but it is practically difficult to accurately change and distribute the interference.

Figure 3:
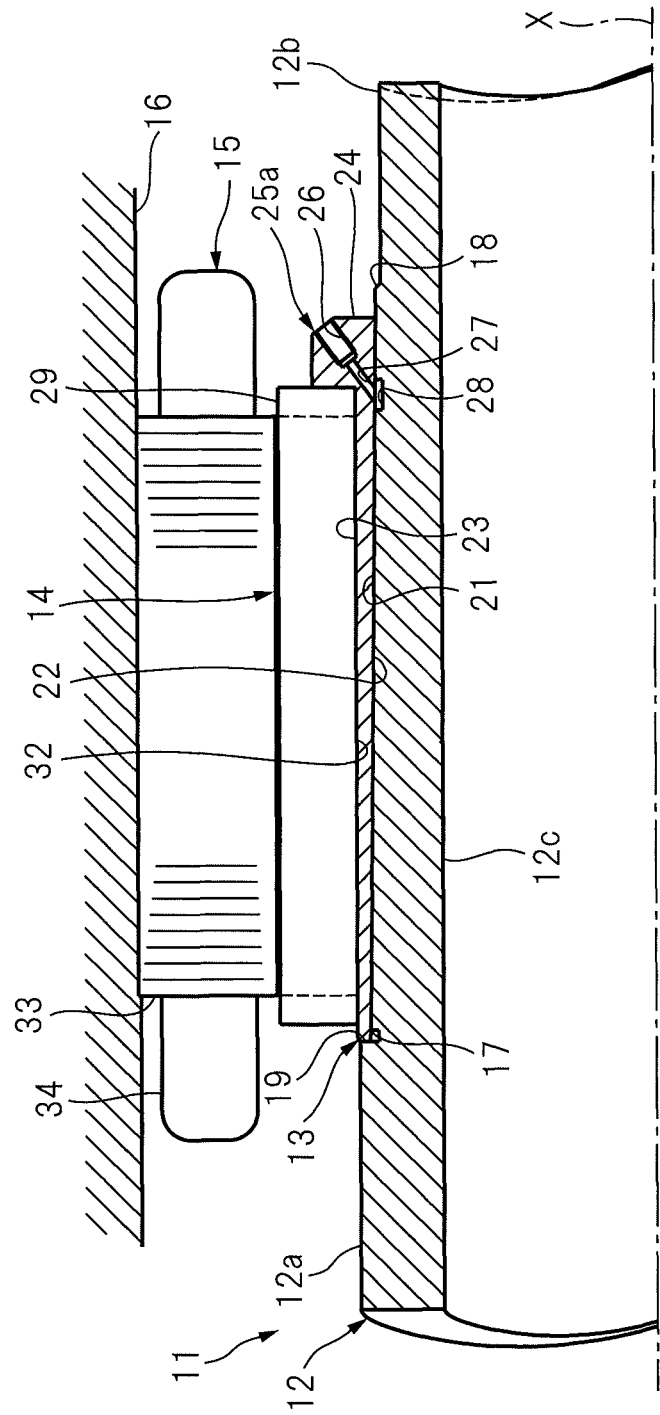
FIG. 3 is a partial longitudinal sectional view schematically showing an electric motor according to a variation of one embodiment of the present invention.
Figure 4:
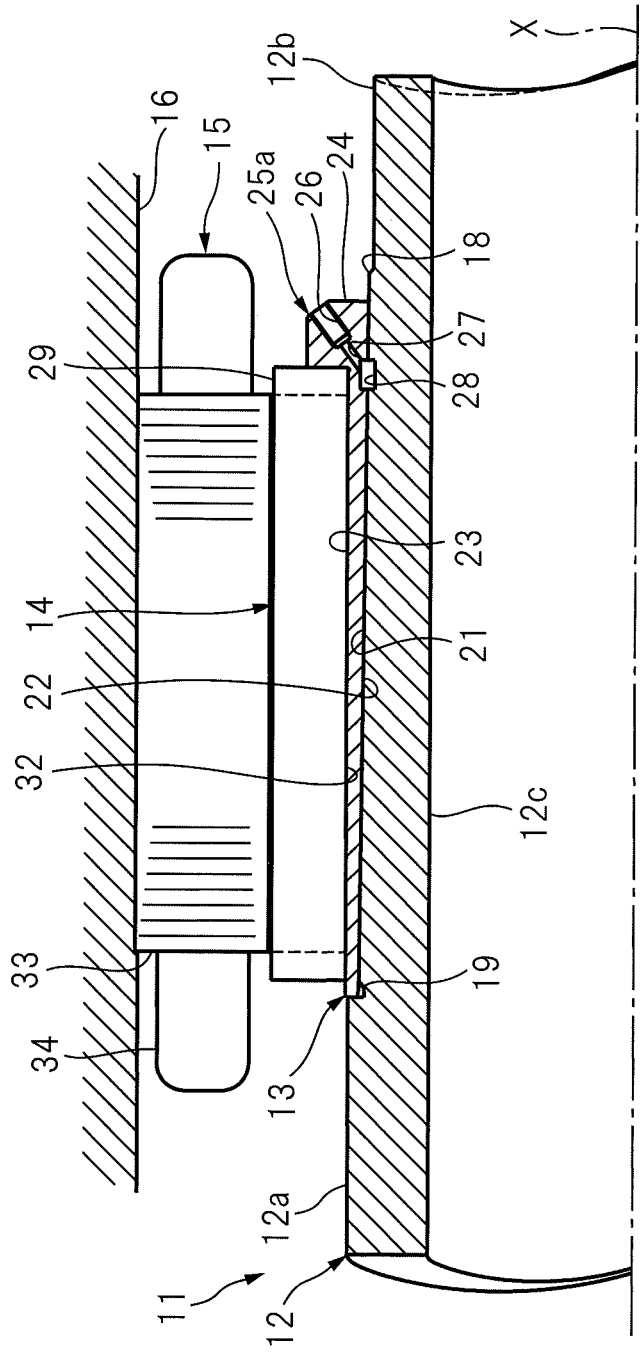
FIG. 4 is a partial longitudinal sectional view schematically showing an electric motor according to another variation of the first embodiment of the present invention.

FIG. 3 is a partial longitudinal view schematically showing an electric motor according to a variation of one embodiment of the present invention. In this electric motor 11, an annular passageway 28 is formed by, in stead of the aforementioned groove formed on the inner circumferential surface 22 of the sleeve 13, a groove formed on the outer circumferential surface 21 of the rotary shaft 12. FIG. 4 is a partial longitudinal view schematically showing an electric motor 11 according to another variation of the first embodiment of the present invention. In this electric motor 11, the annular passageway 28 is formed by a groove formed on the inner circumferential surface 22 of the sleeve 13 as described above and a groove formed on the outer circumferential surface 21 of the rotary shaft 12. In either case, depth and width of the annular passageway 28 may be set as described above.

Figure 5:
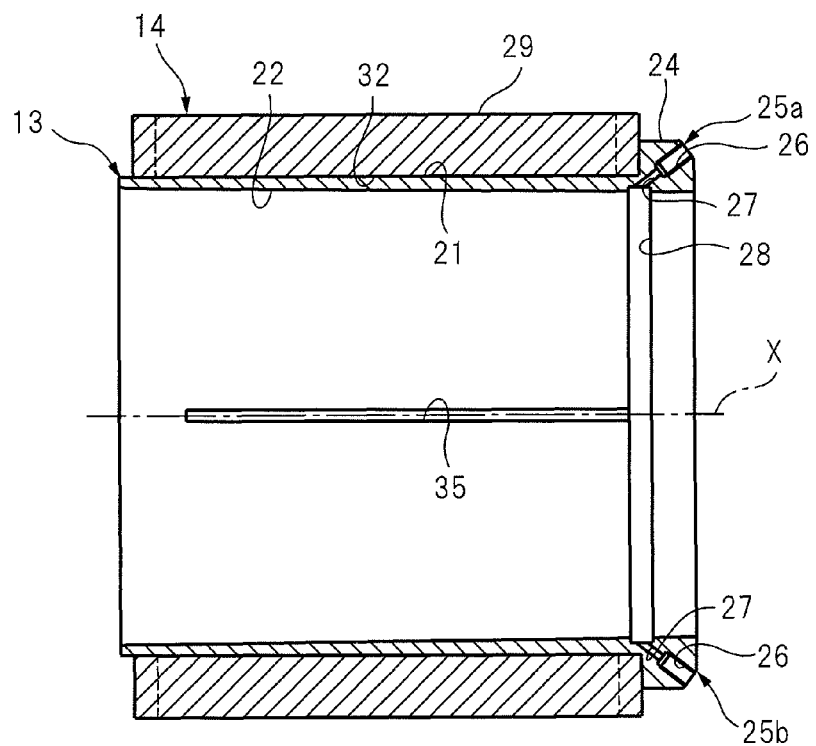
FIG. 5 is a longitudinal sectional view schematically showing a sleeve and a rotor part of an electric motor according to still another variation of one embodiment of the present invention.

FIG. 5 is a longitudinal sectional view schematically showing the sleeve 13 and the rotor part 14 of the electric motor 11 according to still another variant of one embodiment of the present invention. In the sleeve 13 of FIG. 5, a pair of axial passageways 35 are formed on the inner circumferential surface 22 of the sleeve 13. The axial passageways 35 linearly extend from the annular passageway 28 toward the front end of the sleeve 13, i.e., toward the larger diameter section 17 of the rotary shaft 12, in the axial direction of the rotation axis X. These axial passageways 35 are formed by grooves formed on the inner circumferential surface 22 of the sleeve 13. The axial passageways 35 are disposed at positions in rotation symmetry with each other in relation to the rotation axis X. Front ends of the axial passageways 35 are situated at the rear of the front end of the sleeve 13. That is, the axial passageways 35 terminate before the front end of the sleeve 13. The depth and width of the axial passageways 35 are set in the same manner as in the annular passageway 28.

Figure 6:
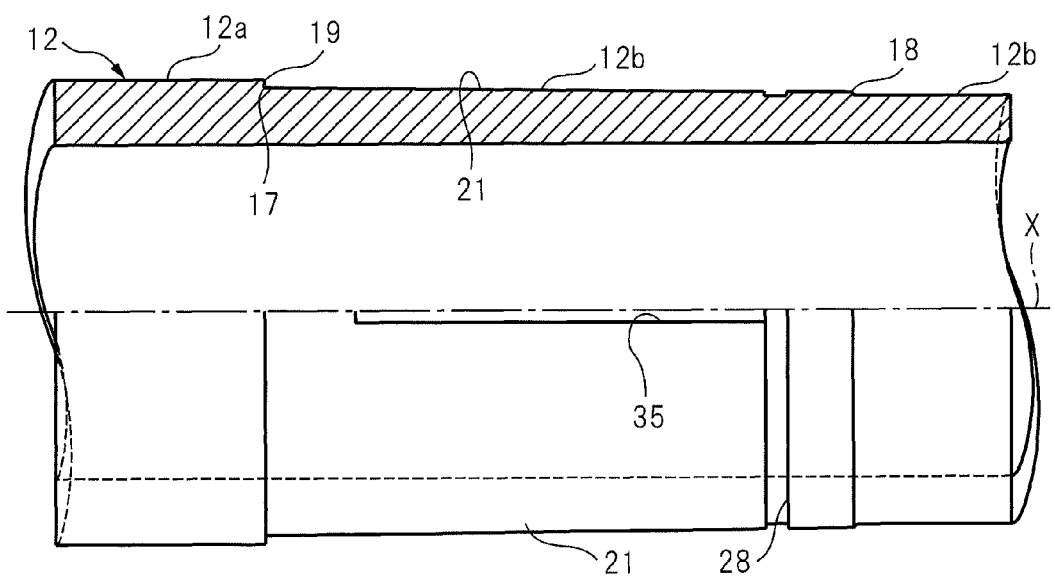
FIG. 6 is a partial longitudinal sectional view schematically showing a rotary shaft of an electric motor according to still another variation of one embodiment of the present invention.

FIG. 6 is a partial longitudinal sectional view schematically showing a rotary shaft 12 of an electric motor 11 according to still another variant of the embodiment of the present invention. In FIG. 6, the outer circumferential surface 21 of the rotary shaft 12 is shown on the lower side of the rotation axis X which appears to be a boundary. In this variant, a pair of axial passageways 35 are formed on the outer circumferential surface 21 of the rotary shaft 12 of FIG. 3. The axial passageways 35 are disposed at positions in rotational symmetry with each other in relation to the rotation axis X. With such axial passageways 35, working fluid injected into the annular passageway 28 flows from the annular passageway 28 toward the larger diameter section 17 of the sleeve 13 through the axial passageways 35. As a result, the working fluid can spread uniformly throughout between the outer circumferential surface 21 of the rotary shaft 12 and the inner circumferential surface 22 of the sleeve 13.

Figure 7:
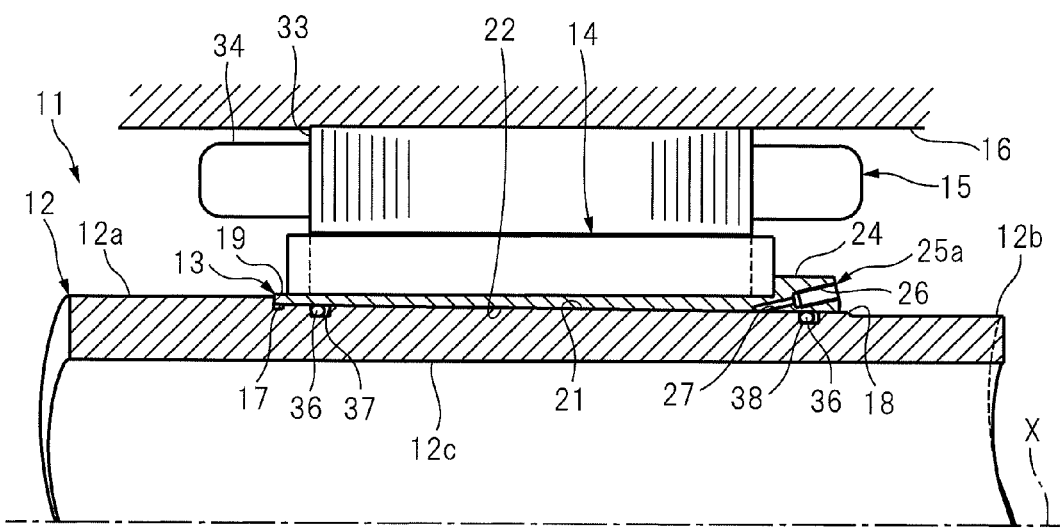
FIG. 7 is a partial longitudinal sectional view schematically showing an electric motor according to still another variation of one embodiment of the present invention.

FIG. 7 is a partial longitudinal sectional view schematically showing an electric motor 11 according to still another variant of the embodiment of the present invention. In this electric motor 11, between the outer circumferential surface 21 of the rotary shaft 12 and the inner circumferential surface 22 of the sleeve 13, a pair of fluid sealing members 36, for example, are held. The sealing members 36 are formed from, for example, an O-ring extending annularly around the rotation axis X. The fluid sealing members 36 extend, for example, to adjoin a front end and a rear end of the sleeve 13, respectively, and are on its inner side disposed in annular grooves 37 and 38, respectively, which are formed on the outer circumferential surface 21 of the rotary shaft 12. The groove 38 is disposed at the rear of the sleeve 13 relative to an opening of the flow path 27 on the inner circumferential surface 22 of the sleeve 13.

The fluid sealing members 36 are formed, for example, from elastic materials such as rubber. As a result, in the state where the sleeve 13 is fixed to the outer circumferential surface 21 of the rotary shaft 12, the fluid sealing members 36 are elastically deformed to be pressed against the outer circumferential surface 21 of the rotary shaft 12 and the inner circumferential surface 22 of the sleeve 13. As a result, a closed space is defined by a pair of fluid sealing members 36 between the rotary shaft 12 and the sleeve 13. With such fluid sealing members 36, working fluid injected between the rotary shaft 12 and the sleeve 13 is enclosed in the closed space between the fluid sealing members 36 and 36. Thus, the working fluid can be prevented from leaking out from the sleeve 13 to the outside of the sleeve 13 along the outer circumferential surface 21 of the rotary shaft 12. On the other hand, if, for example, an O-ring is disposed in an annular groove formed on the inner circumferential surface 22 of the sleeve 13, for example, since the sleeve 13 needs a certain thickness, the inner diameter of the sleeve 13 decreases. As a result, the outer diameter of the rotary shaft 12 also decreases undesirably.

Figure 8:
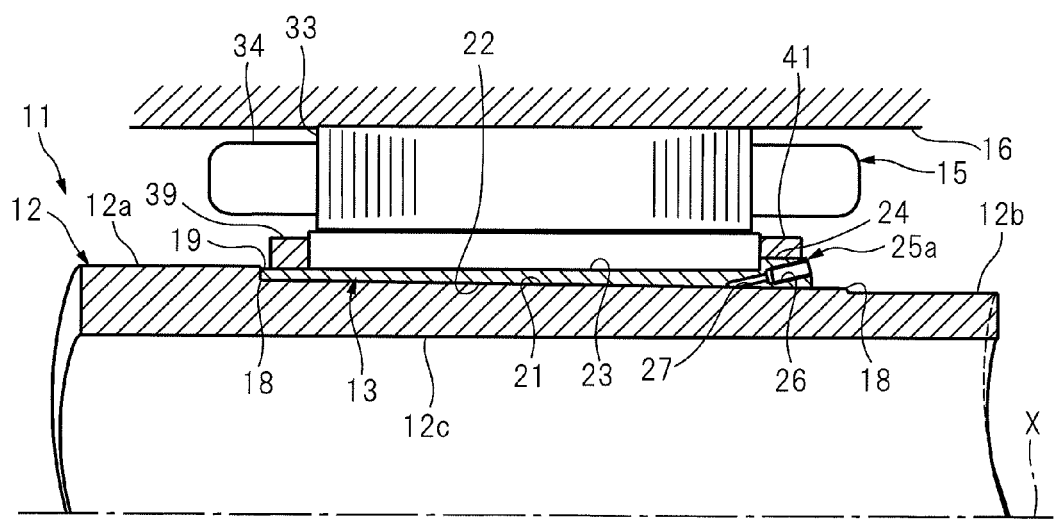
FIG. 8 is a partial longitudinal sectional view schematically showing an electric motor according to another embodiment of the present invention.

FIG. 8 is a partial longitudinal sectional view schematically showing an electric motor 11 according to another embodiment of the present invention. In this electric motor 11, a pair of annular members 39 and 41, for example, are fixed to the outer circumferential surface 23 of the sleeve 13 and on the outer side of the rotor part 14 in the direction of the rotation axis X. The annular members 39 and 41 are fixed, for example, by interference fit to the outer circumferential surface 23 of the sleeve 13. The annular members 39 and 41 exert a certain tightening torque to the sleeve 13 in regions adjacent to the front end and the rear end of the sleeve 13. The annular member 41 is disposed on the flange 24. With such annular members 39 and 41, working fluid injected between the rotary shaft 12 and the sleeve 13 can be prevented from leaking from the sleeve 13 to the outside along the outer circumferential surface 21 of the rotary shaft 12.

The fluid sealing member 36 may be disposed only at one position adjoining either the front end or the rear end of the sleeve 13. Similarly, the annular members 39 and 41 may be disposed only at one position adjoining either the front end or the rear end of the sleeve 13.

Also, a fluid sealing member 36, for example, may be disposed at one of the front end and the rear end of the sleeve 13, while the annular member may be disposed at the other of the front end and the rear end of the sleeve 13. The tightening torque of the sleeve 13, i.e., of the annular members 39 and 41 to the rotary shaft 12 is preferably set to a magnitude so as not to impede removal of the sleeve 13.

Figure 9:
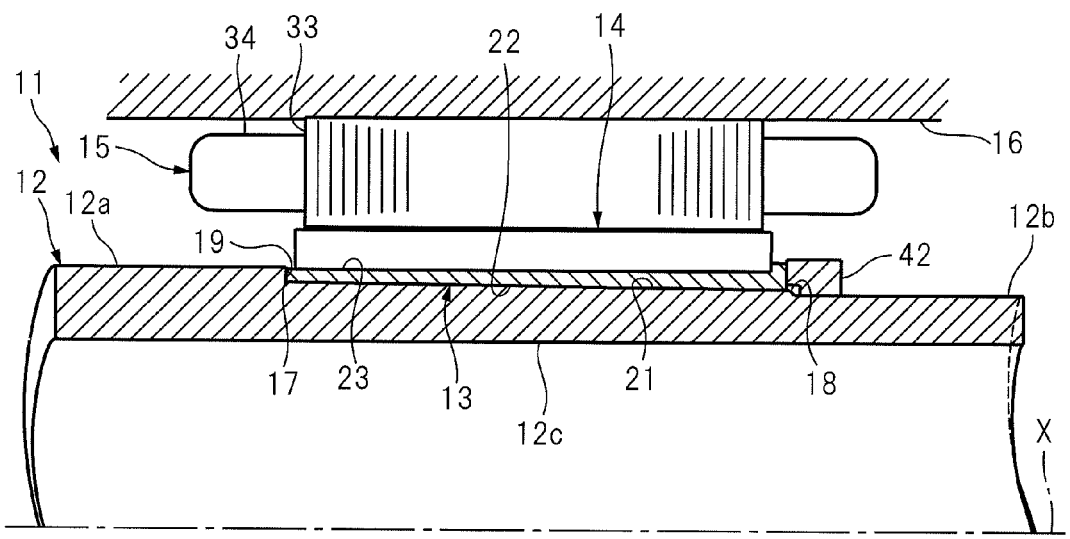
FIG. 9 is a partial longitudinal sectional view schematically showing an electric motor according to still another embodiment of the present invention.
Figure 10:
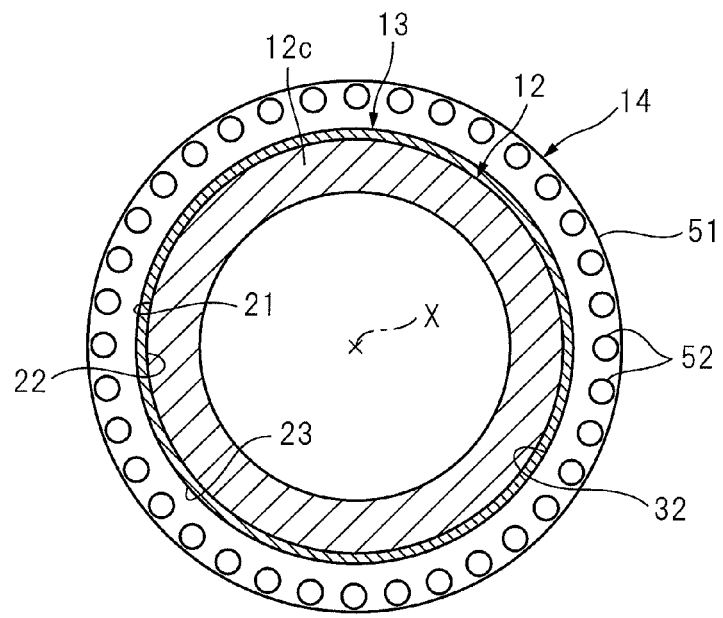
FIG. 10 is a transverse sectional view schematically showing an electric motor according to still another embodiment of the present invention.

FIG. 9 is a partial longitudinal sectional view schematically showing an electric motor 11 according to still another embodiment of the present invention. In this electric motor 11, forming the fluid passageways 25a and 25b is omitted. On the outer circumferential surface 21 of the rotary shaft 12, an annular regulating member 42 is fixed at a position adjoining the rear end of the sleeve 13 and outside of the rotor part 14 in the direction of the rotation axis X. The regulating member 42 receives the rear end surface defined at the rear end of the sleeve 13. Thus, the regulating member 42 prevents the sleeve 13 from falling off in the direction of the rotation axis X. The regulating member 42 can be fixed to the rotary shaft 12 by, for example, shrinkage fit or by means of screw. Such construction can be preferably applied to an electric motor 11 with relatively low rotational speed, or an electric motor 11 with relatively small interference. In removing the rotor part 14, after the regulating member 42 has been removed, the sleeve 13 can be removed from the rotary shaft 12 by pushing the sleeve 13 in the axial direction by a press machine or the like. At this time, injection of working fluid is not required.

In the electric motor 11 as described above, the sleeve 13 has its thickness increased by the flange 24. In the case where thickness of the sleeve 13 varies in this way, if the sleeve 13 is mounted by interference fit to the rotary shaft 12 with constant interference, relatively larger areal pressure is exerted to the rotary shaft 12 at a portion of the flange 24 having a larger thickness as compared to portions other than the flange 24. As a result, the sleeve 13 is fixed to the rotary shaft 12 at the portion of the flange 24 with an excessively large tightening torque. In the case where the interference of the sleeve 13 varies in the direction of the rotation axis X in this manner, there arises problems or inefficiency that rotational precision may be impaired due to distortion or deformation of the rotary shaft 12, or that additional high pressure is required to inject the working fluid at the time of removal of the sleeve 13, or the like.

In order to avoid such problems, interference is preferably adjusted appropriately in accordance with the thickness of the flange 24. In adjusting the interference, a taper ratio of the inner circumferential surface 22 of the sleeve 13 at the portion of the flange 24 may be changed from a taper ratio at the remaining portions other than the flange 24, or the inner circumferential surface 22 at the portion of the flange 24 may be changed to a cylindrical inner circumferential surface 22 about the rotation axis X. Similarly, a taper ratio of the outer circumferential surface 21 of the rotary shaft 12 may be changed. Also, a so-called relief such as a groove may be formed on the inner circumferential surface 22 of the sleeve 13 at the portion of the flange 24 or on the corresponding outer circumferential surface 21 of the rotary shaft 12. Such adjustment of interference is preferably made such that working fluid does not leak from the sleeve 13 to the outside.

The electric motor 11 may be configured as, for example, a squirrel cage type of induction motor, rather than as a synchronous motor with permanent magnets embedded therein as described above. In this electric motor 11, the rotor part 14 comprises an iron core 51 formed as a stack of a plurality of magnetic steel sheets stacked along the rotation axis X, for example, and a plurality of conductor bars 52 disposed in the iron core 51. The conductor bars 52 are disposed to be, for example, equally spaced around the rotation axis X, and to adjoin the outer circumferential surface of the iron core 51. The rotor part 14 comprises a pair of annularly-shaped conductor end-rings (not shown) disposed at both ends of the iron core 51 in the direction of the rotation axis X. These end-rings electrically short-circuit both ends of the conductor bar 52. The conductor bar 52 and the conductor end-rings are formed, for example, from electrically conductive materials such as aluminum.

Figure 11:
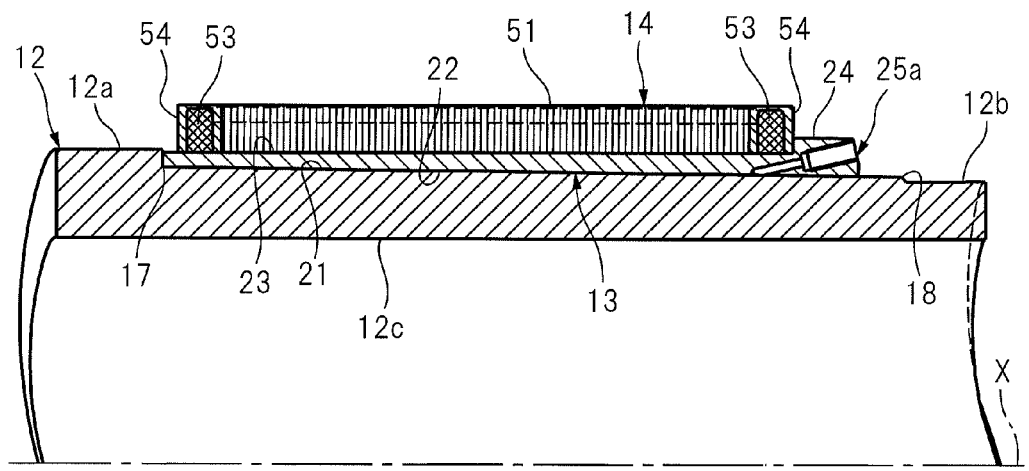
FIG. 11 is a partial longitudinal sectional view schematically showing an electric motor according to still another embodiment of the present invention.
Figure 12:
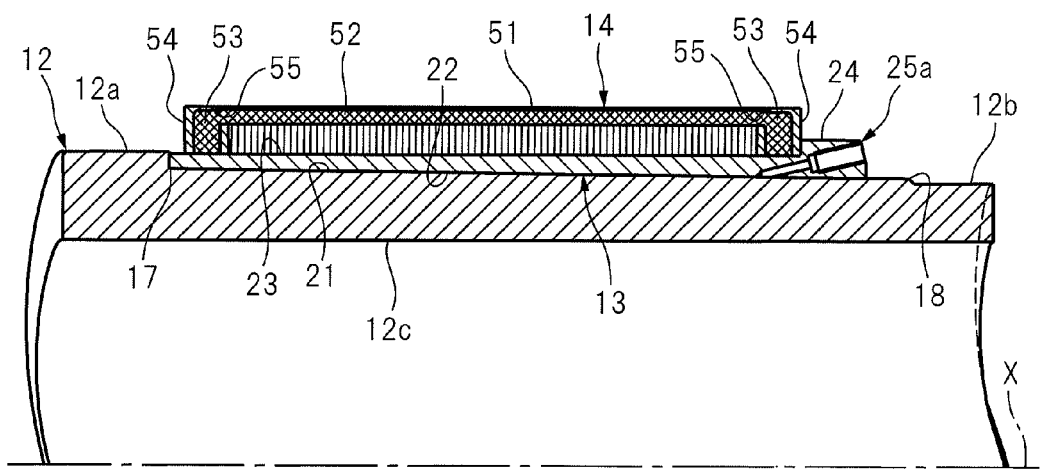
FIG. 12 is a partial longitudinal sectional view schematically showing an electric motor according to still another embodiment of the present invention.

In the squirrel cage type of induction electric motor 11 as described above, as shown in FIG. 11, the rotor part 14 may further comprise reinforcing rings 54 and 54 respectively surrounding conductor end-rings 53 and 53 from the outside in the radial direction perpendicular to the rotation axis X. These reinforcing rings 54 can be formed from metal materials such as titanium alloy, for example. The outer diameter of the reinforcing ring 54 coincides with the outer diameter of the iron core 51, and the inner diameter of the reinforcing ring 54 coincides with the inner diameter of the iron core 51. By means of such reinforcing rings 54, destruction of the conductor end-rings 53 due to centrifugal force, for example, can be prevented. As shown in FIG. 12, the reinforcing rings 54 are provided with a plurality of through-holes 55 for receiving the conductor bars 52, respectively. In this way, the conductor bars 52 and the conductor end-rings 53 can be short-circuited. Such an electric motor 11 is used, for example, in the case of high speed rotation exceeding 20000 revolutions per minutes.

In the squirrel cage type induction electric motor, the case is assumed where the rotor part 14 is mounted, for example, by shrinkage fit without the sleeve 13. The linear expansion coefficient of iron forming the iron core 51 is $12 \times 10^{-6}$. Thus, with the inner diameter of the rotor part 14 being 60 mm, and interference being 0.1 mm in diameter, for example, if temperature of the rotary shaft 12 is 20° C. and the rotor part 14 is heated to about 250° C., a gap at the time of shrinkage fitting is about 65 µm. The rotor part 14 has the reinforcing ring 54 made of titanium alloy, and the linear expansion coefficient of the titanium alloy is $8.4 \times 10^{-6}$ and about 0.7 times that of iron. Thus, a gap at a portion of the reinforcing ring 54 is only about 15 µm. As a result, in order to ensure that sufficient gaps are formed, the rotor part 14 needs to be heated to a higher temperature, for example, to about 300° C. However, as temperature becomes higher, distortion of the rotor part 14 after shrinkage fitting becomes greater, so that not only does the risk of failure of shrinkage fitting increase, but also it is undesirable for safety.

On the other hand, in the electric motor 11 according to the present invention, the rotor part 14 is mounted by shrinkage fit to the sleeve 13 with interference of 0.02 mm, for example. At this time, with the interference of 0.02 mm, it suffices to have temperature difference of about 120° C. between the sleeve 13 and the rotor part 14, even if the reinforcing ring 54 is made of titanium alloy. In this case, it is sufficient to ensure a gap of about 30 µm. Then, if the sleeve 13 is pressed into the rotary shaft 12, while ensuring interference of 80 µm between the sleeve 13 and the rotary shaft 12, interference fit with total interference of 100 µm, i.e., of 0.1 mm can be achieved. Thus, according to the present invention, when the rotor part 14 having a part of small linear expansion coefficient such as titanium alloy is mounted to the rotary shaft 12, the operation therefor can be simplified as compared to the prior art. In addition, since excessive heating is not required, distortion and deformation of the rotary shaft 12 can be restricted.

Figure 13:
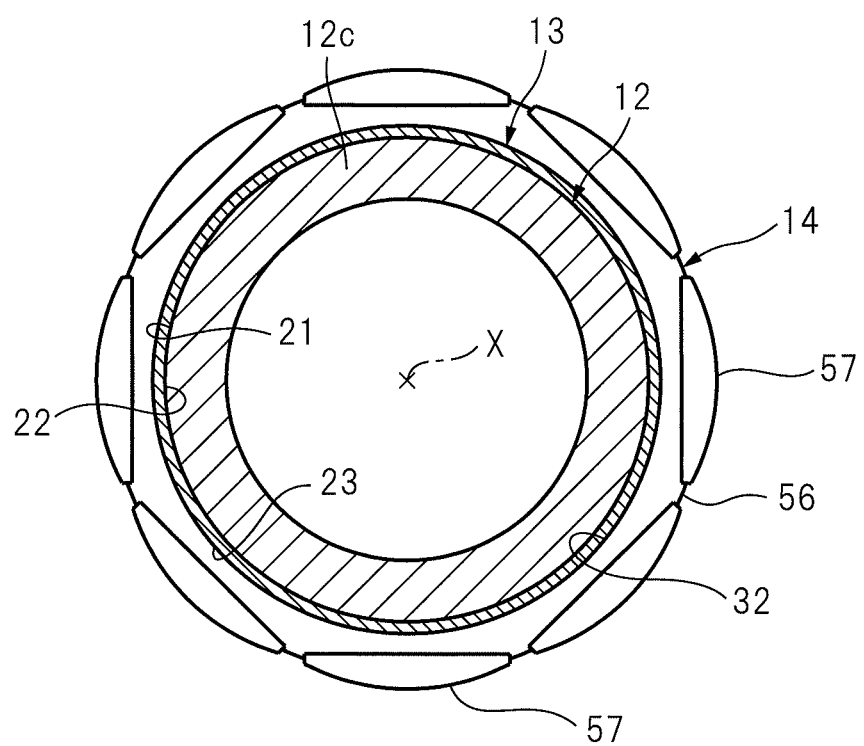
FIG. 13 is a transverse sectional view schematically showing an electric motor according to still another embodiment of the present invention.

The electric motor 11 may be constructed, as shown in FIG. 13, as a synchronous motor with permanent magnets mounted on its surface, rather than as one with permanent magnets embedded therein. In this electric motor 11, the rotor part 14 comprises an iron core 56 formed as a stack of a plurality of magnetic steel sheets stacked along the rotation axis X, for example, and a plurality of permanent magnets 57 attached onto the outer circumferential surface of the iron core 56, for example, and equally spaced around the rotation axis X. The permanent magnets 57 are attached onto the outer circumferential surface of the iron core 56, for example, by means of an adhesive. The permanent magnets 57 may be fitted, for example, into grooves formed on the outer circumferential surface of the iron core 56. The iron core 56 may be made of magnetic materials including carbon steel such as S45C.

EFFECT OF THE INVENTION

In accordance with the present invention, an electric motor is provided in which the sleeve can be mounted to the rotary shaft with high precision.

Although the invention has been shown and described with exemplary embodiments thereof, it should be understood by those skilled in the art that the foregoing and various changes, omissions and additions may be made therein and thereto without departing from the spirit and scope of the invention.

The invention claimed is:

1. An electric motor comprising:
   a rotary shaft having an outer circumferential surface with a diameter that decreases from a larger diameter section having a first diameter toward a smaller diameter section having a second diameter smaller than said first diameter;
   a sleeve mounted to said rotary shaft by interference fit with an inner circumferential surface having a diameter that decreases from a front end adjoining said larger diameter section toward a rear end adjoining said smaller diameter section, to the outer circumferential surface of said rotary shaft; and
   a cylindrical rotor part mounted by interference fit to an outer circumferential surface of said sleeve,
   wherein said sleeve comprises a fluid passageway extending through from an outer face of said sleeve including the outer circumferential surface of said sleeve to the inner circumferential surface of said sleeve,
   wherein said electric motor further comprises:
   an annular passageway formed between the inner circumferential surface of said sleeve and the outer circumferential surface of said rotary shaft, the annular passageway extending annularly around a rotation axis of said rotary shaft and being connected to said fluid passageway; and
   an axial passageway formed between the inner circumferential surface of said sleeve and the outer circumferential surface of said rotary shaft, the axial passageway extending from said annular passageway toward said larger diameter section in the direction of said rotation axis.

2. The electric motor according to claim 1, further comprising an annular member adjoining at least one of the front end and the rear end of said sleeve, and mounted by interference fit to said sleeve.

3. The electric motor according to claim 1, further comprising a regulating member mounted to the outer circumferential surface of said rotary shaft at the rear end of said sleeve and regulating falling-off of said sleeve from said rotary shaft.

4. A machine tool comprising an electric motor according to claim 1.

5. The electric motor according to claim 1, wherein the rotary shaft further has a tapered portion extending between the larger diameter section and the smaller diameter section, the tapered portion having a diameter that gradually decrease from the larger diameter section toward the smaller diameter section, and
   wherein the sleeve has a thickness that gradually increases from the front end toward the rear end other end over a portion extending axially adjacent to the rotor part, so as to conform with the tapered portion of the rotary shaft.

6. The electric motor according to claim 1, wherein said axial passageway extends separately from said annular passageway toward said larger diameter section in the direction of said rotational axis.

7. The electric motor according to claim 1, wherein the sleeve mounted to said rotary shaft by press fit with the inner circumferential surface having the diameter that decreases from the front end adjoining said larger diameter section toward the rear end adjoining said smaller diameter section, to the outer circumferential surface of said rotary shaft.

8. The electric motor according to claim 1, wherein the sleeve mounted to said rotary shaft by a non-shrink fit interference fit with the inner circumferential surface having the diameter that decreases from the front end adjoining said larger diameter section toward the rear end adjoining said smaller diameter section, to the outer circumferential surface of said rotary shaft.

9. A method, comprising:
   manufacturing an electric motor by executing the following actions:
      obtaining a rotary shaft having an outer circumferential surface with a diameter that decreases from a larger diameter section having a first diameter toward a smaller diameter section having a second diameter smaller than said first diameter;
      mounting a sleeve to said rotary shaft by interference fit with an inner circumferential surface having a diameter that decreases from a front end adjoining said larger diameter section toward a rear end adjoining said smaller diameter section, to the outer circumferential surface of said rotary shaft;
      mounting a cylindrical rotor part by interference fit to an outer circumferential surface of said sleeve,
      wherein the said sleeve comprises a fluid passageway extending through from an outer face of said sleeve including the outer circumferential surface of said sleeve to the inner circumferential surface of said sleeve; and
   manufacturing the electric motor such that, once manufactured, the electric motor comprises:
      an annular passageway formed between the inner circumferential surface of said sleeve and the outer circumferential surface of said rotary shaft, the annular passageway extending annularly around a rotation axis of said rotary shaft and being connected to said fluid passageway; and
      an axial passageway formed between the inner circumferential surface of said sleeve and the outer circumferential surface of said rotary shaft, the axial passageway extending from said annular passageway toward said larger diameter section in the direction of said rotation axis.

10. The method of claim 9, wherein the rotary shaft further has a tapered portion extending between the larger diameter section and the smaller diameter section, the tapered portion having a diameter that gradually decrease from the larger diameter section toward the smaller diameter section, and
    wherein the sleeve has a thickness that gradually increases from the front end toward the rear end other end over a portion extending axially adjacent to the rotor part, so as to conform with the tapered portion of the rotary shaft.

11. The method of claim 9, wherein said axial passageway extends separately from said annular passageway toward said larger diameter section in the direction of said rotational axis.

12. The method of claim 9, wherein the action of mounting the sleeve to said rotary shaft by interference fit entails mounting the sleeve to said rotary shaft by press fit.

13. The method of claim 9, wherein the action of mounting the sleeve to said rotary shaft by interference fit entails mounting the sleeve to said rotary shaft with a process that does not include a shrink fit.

* * * * *